United States Patent [19]

Mehta

[11] Patent Number: 4,986,145

[45] Date of Patent: Jan. 22, 1991

[54] METHOD OF ENGINE MODEL DETERMINATION FOR USE IN AN ELECTRONICALLY-CONTROLLED AUTOMATIC TRANSMISSION

[75] Inventor: Hemang S. Mehta, Sterling Heights, Mich.

[73] Assignee: Chrysler Corporation, Highland Park, Mich.

[21] Appl. No.: 437,238

[22] Filed: Nov. 16, 1989

[51] Int. Cl.$^5$ ............................................. B60K 41/04
[52] U.S. Cl. ...................................... 74/843; 74/844; 74/856
[58] Field of Search .................. 74/843, 844, 856, 878

[56] References Cited

U.S. PATENT DOCUMENTS

| | | | |
|---|---|---|---|
| 3,895,541 | 7/1975 | Nohira et al. | 74/844 |
| 4,419,909 | 12/1983 | Opperud et al. | 74/856 |
| 4,829,434 | 5/1989 | Karmel et al. | 74/844 |
| 4,894,780 | 1/1990 | Simonyi et al. | 74/844 |

FOREIGN PATENT DOCUMENTS 0148661  12/1978  Japan ...................................... 74/844

*Primary Examiner*—Dwight Diehl
*Assistant Examiner*—Ryan Massey
*Attorney, Agent, or Firm*—Mark P. Calcaterra

[57] ABSTRACT

A method of engine determination is used in an electronically-controlled automatic transmission system. A transmission controller is capable of determining the particular engine model by data sent by the engine controller. The method includes determining whether the data received equals a first predetermined engine model byte stored in RAM. If not, the method determines whether the data received is valid. If so, the method determines whether the data received equals a second predetermined engine model byte stored in EEPROM.

4 Claims, 1 Drawing Sheet

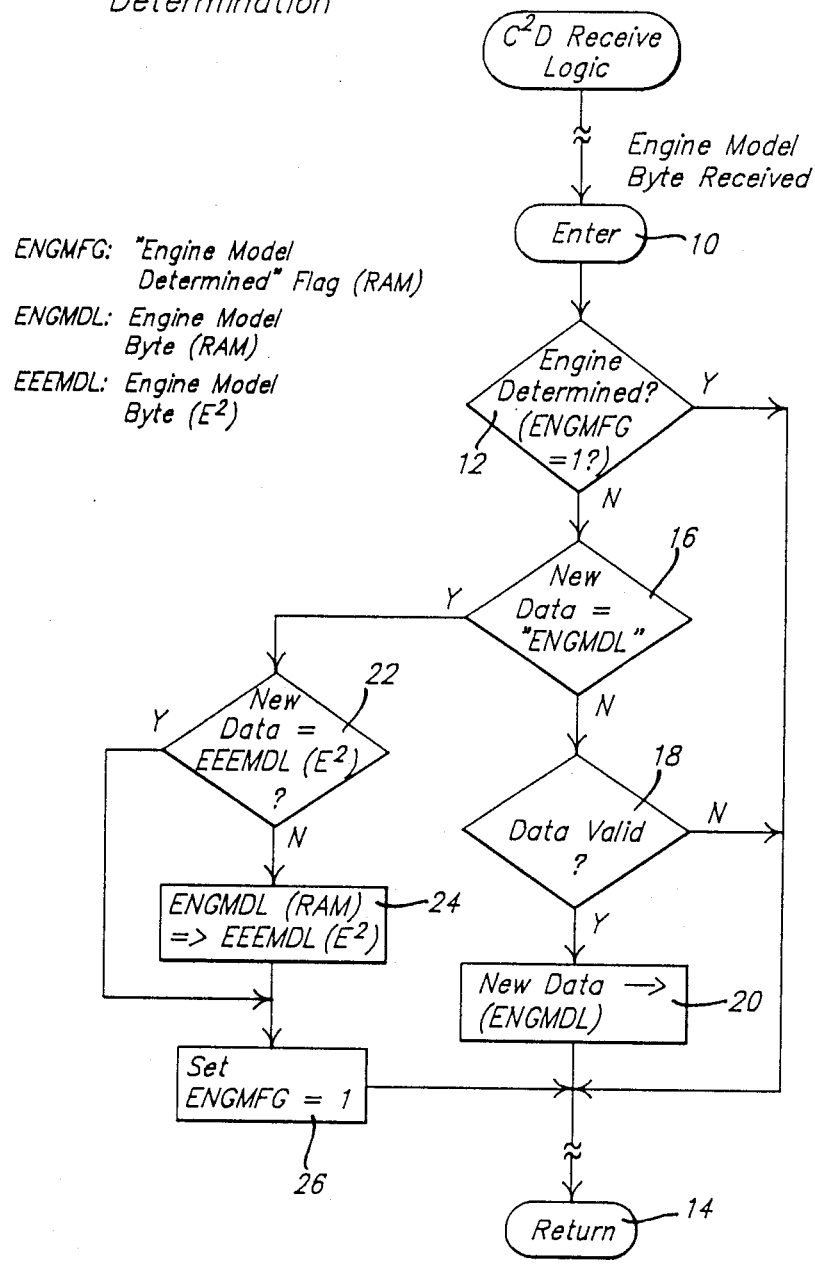

0
METHOD OF ENGINE MODEL DETERMINATION FOR USE IN AN ELECTRONICALLY-CONTROLLED AUTOMATIC TRANSMISSION

BACKGROUND OF THE INVENTION

1. Field of the Invention

The present invention relates to an automatic transmission primarily intended for motor vehicle use, and more particularly, to a method of determining the proper engine model for use with a transmission that is controlled electronically and hydraulically.

2. Description of Related Art

Automatic transmissions are designed to take automatic control of frictional units, gear ratio selection and gear shifting. Typically, a transmission control system for an automatic transmission includes a microcomputer-based controller. An example of such a transmission microcomputer-based controller is described in pending application, Ser. No. 187,772, entitled "An Electronically-Controlled, Adaptive Automatic Transmission System" to inventors Leising et al.

The transmission controller receives input signals indicative of engine speed, turbine speed, output speed (vehicle speed), throttle angle position, brake application, predetermined hydraulic pressure, the drive selected gear or operating condition (PRNODDL), engine coolant temperature, and/or ambient temperature. The transmission controller generates command or control signals for causing the actuation of a plurality of solenoid-actuated valves which regulate the application and release of pressure to and from the frictional units of the transmission system. Accordingly, the transmission controller will execute predetermined shift schedules stored in the memory of the controller through appropriate command signals to the solenoid-actuated valves and the feedback which is provided by various input signals.

Currently, manufacturers of vehicles such as automobiles produce various engine sizes or types, e.g. 2.0 Liter, 2.5 Liter, etc. The transmission has a unique shift schedule for each of these various engine sizes or types. As a result, a unique transmission controller having its own corresponding part number is required because the shift schedule has to be stored for each engine size or type in the transmission controller. Accordingly, the transmission controller needs a different part number per engine, resulting in inventory and storage problems.

3. Objects of the Present Invention

It is one object of the present invention to determine the engine size or type by the transmission controller.

It is another object of the present invention to provide one transmission controller for various engine types or sizes.

It is a further object of the present invention to eliminate multiple part numbers for the transmission controller.

SUMMARY OF THE INVENTION

To achieve the foregoing objects, the present invention provides a methodology for determining the particular engine type. This is accomplished by the engine controller transmitting a unique engine model code for each engine type over a communications bus. The transmission controller receives the transmitted code and determines which engine type the particular vehicle is equipped with. As a result, a common transmission controller having one part number can be replaced (new) or exchanged between vehicles with dis-similar engine sizes or types.

Other objects, features and advantages of the present invention will become more fully apparent from the following description of the preferred embodiment, appended claims and accompanying drawings.

BRIEF DESCRIPTION OF THE DRAWINGS

The FIGURE is a flowchart of the engine determination methodology according to the present invention.

DESCRIPTION OF THE PREFERRED EMBODIMENT

As described in copending application, U.S. Ser. No. 187,772, entitled, "An Electronically-Controlled, Adaptive Automatic Transmission System", which is hereby incorporated by reference, a transmission control system includes an engine controller, a transmission controller and a Chrysler Collision Detection (CCD) serial data bus for allowing communication between the engine controller and transmission controller.

Referring to the FIGURE, the engine model determination methodology according to the present invention is shown. The engine controller transmits a particular or unique engine model code or data across the CCD serial data bus which is received by the transmission controller. The methodology starts or enters through bubble 10 and advances to diamond 12. In diamond 12, the methodology determines whether the particular engine model or type has been previously determined by looking for an "engine model determined flag" (ENGMFG), for example. If so, the methodology advances to bubble 14 and returns.

If the particular engine model has not been previously determined in diamond 12, the methodology advances to diamond 16 and determines whether new data or code of the particular engine model sent by the engine controller across the CCD serial data bus to the transmission controller is equal to a first predetermined engine model byte (ENGMDL) stored in random access memory (RAM). If not, the methodology advances to diamond 18 and determines whether the new data received is valid by comparing the new data to a plurality of acceptable predetermined engine model data or codes stored in memory of the transmission controller to see if a match exists. If the new data is not valid, the methodology advances to bubble 14 and returns. If the new data is valid, the methodology advances to block 20 and sets the first predetermined engine model byte in RAM equal to the new data. The methodology then advances to bubble 14 and returns.

If the new data is equal to the first predetermined engine model byte in diamond 16, the methodology advances to diamond 22 and determines whether the new data equals a second predetermined engine model byte (EEEMDL) in the onboard EEPROM ($E^2$) of the transmission controller. If not, the methodology advances to block 24 and sets the second predetermined engine model byte in $E^2$ equal to the first predetermined engine model byte in RAM. The methodology then advances to block 26. If the new data is equal to the second predetermined engine model byte in $E^2$, the methodology advances to block 26. In block 26, the methodology sets the engine model determined flag in RAM and advances to bubble 14 and returns.

Accordingly, once the engine model is determined, the transmission controller accesses the proper shift schedule table for that particular engine model from a plurality of shift schedule tables to be used for a shift schedule routine of the transmission control system.

The present invention has been described in an illustrative manner. It is to be understood that the terminology which has been used is intended to be in the nature of words of description rather than of limitation.

Obviously, many modifications or variations of the present invention are possible in light of the above teachings. Therefore, within the scope of the appended claims, the present invention may be practiced otherwise than as specifically described.

What is claimed is:

1. In a vehicle having an engine, an electronic engine controller for controlling the response of the engine, a transmission control system including a transmission having a plurality of gears for transmitting power from the engine to the vehicle over desired ranges of torque and speed and an electronic transmission controller for controlling the shifting of the gears of the transmission, a communications interface to provide a communications link between the engine controller and the transmission controller, a method of determining a particular engine model of the engine from a plurality of engine models by the transmission controller for use in controlling the shifting of the transmission, said method comprising:

receiving data of a particular engine model by a transmission controller across a communications interface from an engine controller;

determining whether the data received of the particular engine model equals a first predetermined engine model value stored in RAM;

comparing the data received to a plurality of predetermined engine model values stored in memory to determine if the data received is valid;

setting the first predetermined engine model value in RAM equal to the data received if the data received is valid; and ending the method if the data received is not valid.

2. A method as set forth in claim 1 including the steps of: determining whether the particular engine model has been determined by looking for a flag; and ending the method if the particular engine model has been determined.

3. A method as set forth in claim 2 including the steps of: determining whether the data received of the particular engine model equals a second predetermined engine model value stored in EEPROM if the data received does equal the first predetermined engine model value;

setting the second predetermined engine model value in EEPROM equal to the first predetermined engine model value in RAM if the data received does not equal the second predetermined engine model value; and setting an engine model determined flag if the data received equals the second predetermined engine model value in EEPROM.

4. In a vehicle having an engine, an electronic engine controller for controlling the response of the engine, a transmission control system including a transmission having a plurality of gears for transmitting power from the engine to the vehicle over desired ranges of torque and speed and an electronic transmission controller for controlling the shifting of the gears of the transmission, a communications interface to provide a communications link between the engine controller and the transmission controller, a method of determining a particular engine model of the engine from a plurality of engine models by the transmission controller for use in controlling the shifting of the transmission, said method comprising:

receiving data of a particular engine model by a transmission controller across a communications interface from an engine controller;

determining whether the particular engine model has been previously determined by looking for a flag;

ending the method if the particular engine model has been previously determined;

determining whether the data received of the particular engine model equals a first predetermined engine model byte stored in RAM;

comparing the data received to a plurality of predetermined engine model values stored in memory to determine if the data received is valid;

setting the first predetermined engine model byte in RAM equal to the data received if the data received is valid;

ending the method if the data received is not valid;

determining whether the data received equals a second predetermined engine model byte stored in EEPROM if the data received does equal the first predetermined engine model byte;

setting the second predetermined engine model byte in EEPROM equal to the first predetermined engine model byte in RAM if the data received does not equal the second predetermined engine model byte; and setting an engine model determined flag if the data received equals the second predetermined engine model byte in EEPROM.

* * * * *